United States Patent Office 3,484,520
Patented Dec. 16, 1969

3,484,520
COMPOSITIONS AND METHODS FOR TREATING HELMINTHIASIS COMPRISING COMBINATIONS OF ORGANO-PHOSPHATES AND CERTAIN DIBENZOCYCLOHEPTENES
Joseph Di Netta, Elizabeth, and John R. Egerton, Neshanic Station, N.J., assignors to Merck & Co., Inc., Rahway, N.J., a corporation of New Jersey
No Drawing. Filed May 17, 1965, Ser. No. 456,481
Int. Cl. A01n 9/36; A61k 21/00, 27/00
U.S. Cl. 424—200          16 Claims

ABSTRACT OF THE DISCLOSURE

The treating of helminthiasis in animals with various organo phosphates and dibenzocycloheptenes.

---

This invention relates to compositions and methods useful in the treatment of parasitic diseases in animals. More particularly, the invention relates to compositions containing anthelmintically active organo-phosphates and certain tricyclic compounds in which the anthelmintic action of the composition is demonstrably enhanced over that expected from the activity of either ingredient when used alone, and to methods for using said compositions. Specifically, it relates to the methods and compositions above mentioned wherein the organo-phosphates contain homocyclic, heterocyclic, or mixed cyclic systems, substituted or unsubstituted, and the tricyclic compounds are dibenzocycloheptenes.

Helminthiasis is a widely occurring disease affecting animals and causes large economic losses in the domesticated animal industry. Particularly susceptible to the disease are ruminants such as sheep, cattle, and goats, and equines such as horses and mules. A wide variety of anthelmintic agents have been discovered and have varying degrees of efficacy on the particular helminths causing the infections. Among such classes of materials is a family of certain dibenzocycloheptenes. Also of some interest has been a series of organo-phosphates, most of which, while possessing anthelmintic activity, have the disadvantage of being toxic at levels dangerously close to the efficacious levels. In view of the large economic interest in the prevention and control of helminthiasis, modern-day research, in addition to seeking new classes of anthelmintically active materials, is also directed to finding ways for eliminating disadvantages in, and improving the efficacy of, the currently known anthelmintic agents.

It is accordingly an object of the present invention to provide compositions possessing a high degree of anthelmintic activity. Another object is to provide compositions which contain certain dibenzocycloheptenes and organo-phosphates in which the anthelmintic potency and efficacy of the composition is enhanced over the additive effect of the dibenzocycloheptene and organo-phosphate. Yet a further object is to provide methods for treating helminthiasis with organo-phosphates with the substantial absence of significant toxic effects. Still another object is to provide a method for treating helminthiasis with compositions containing dibenzocycloheptenes and organo-phosphates wherein the dosage levels are substantially reduced over those required when each is administered alone. These and other objects will appear from the detailed description which follows.

According to the present invention, it has been surprisingly discovered that the anthelmintic effect of organo-phosphates and dibenzocycloheptenes is greatly enhanced when either of them is administered to the host animal in the presence of the other. Thus, in one of its preferred aspects, the invention provides novel 2-component compositions wherein one component is at least one compound of a class of organo-phosphates and the other component is at least one of certain dibenzocycloheptenes. The organo-phosphates that may be employed in the present invention are selected from the class of compounds having the structural formula

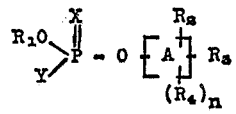

where X is oxygen or sulfur, Y is —$OR_1$ or —$NHR_1$, $R_1$ is alkyl, straight chain or branched, such as methyl, ethyl, propyl, isopropyl, butyl, t-butyl, octyl, decyl, and the like, or haloalkyl such as chloromethyl, bromomethyl, 2-chloroethyl, 2-bromoethyl, chloropropyl, chlorobutyl, and the like, A is a homocyclic or a heterocyclic system such as phenyl, coumarinyl, or naphthaloximido, $R_2$, $R_3$, and $R_4$ are hydrogen, halogen such as chloro, bromo, and fluoro, or alkyl such as methyl, ethyl, isopropyl, butyl, t-butyl, octyl, dodecyl, and the like, and $n$ is 0 or 1 and is 0 when A is coumarinyl. The preferred organo-phosphates are those wherein A is naphthaloximido and coumarinyl. Representative of the compounds within the foregoing formula are naphthaloximido compounds of the formula

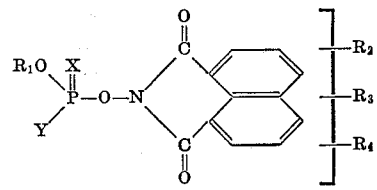

wherein $R_1$, $R_2$, $R_3$, $R_4$, Y, and X are as above defined and the attachment lines from $R_2$, $R_3$, and $R_4$ into the bracket signify attachments in either or both of the benzo rings. Typical of such compounds are O,O-diethyl-O-naphthaloximido phosphate, O,O-dimethyl-O-naphthaloximido phosphate, O,O-dipropyl-O-naphthaloximido phosphate, O,O-diethyl-O-naphthaloximido phosphorothioate, and the like; phenyl compounds of the formula

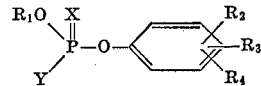

wherein $R_1$, $R_2$, $R_3$, $R_4$, Y, and X are as above defined, and represented by compounds such as O-methyl-O-(4-t-butyl-2-chlorophenyl)methyl phosphoroamidate, O-methyl-O-(4-methyl-2-chlorophenyl)methyl phosphoroamidate, O-ethyl-O-(4-t-butyl-2-chlorophenyl)ethyl phosphoroamidate, O-methyl-O-(4-t-butyl-2-chlorophenyl)methyl phosphoroamidothioate, O,O-dimethyl-O-2,4,5-trichlorophenyl phosphorothioate, O,O-diethyl-O-2,4,5-trichlorophenylphosphorothioate, O,O-dimethyl-O-2,4,5-tribromophenyl phosphorothioate, O,O-dimethyl-O-2,4,5-trichlorophenyl phosphate, O,O-diethyl-O-2,4,5-trichlorophenyl phosphate, and the like; and coumarinyl compounds of the formula

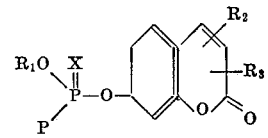

wherein $R_1$, $R_2$, $R_3$, Y and X are as previously defined, and represented by such compounds as O,O-di(2-chloroethyl)-O-(3-chloro-4-methyl-7-coumarinyl)phosphate, O,O-di(2-chloro-methyl)-O-(3-chloro-4-methyl-7-coumarinyl)phosphate, O,O-di(2-bromoethyl)-O-(3-chloro-4-methyl-7-coumarinyl)phosphate, O,O-di(2-chloroethyl)-O-(3-bromo-4-ethyl-7-coumarinyl)-phosphate, O,O-diethyl - O - (3-chloro-4-methyl-7-coumarinyl)-phosphate, O,O-dimethyl-O-(3-chloro-4-methyl-7-coumarinyl)- phosphate, O,O-diethyl-O-(3-chloro-4-methyl-7-coumarinyl)-phosphorothioate, O,O-dimethyl-O-(3-chloro-4-methyl-7-coumarinyl)phosphorothioate, and the like.

Preferred among the foregoing are the coumarinyl and the naphthaloximido compounds, and most preferred for use in the invention are O,O-diethyl-O-naphthaloximido phosphate and O,O-di(2-chloroethyl)-O-(3-chloro-4-methyl-7-coumarinyl)phosphate.

The class of dibenzocycloheptenes which may be employed in the present invention are compounds selected from the group consisting of compounds of the general formulae

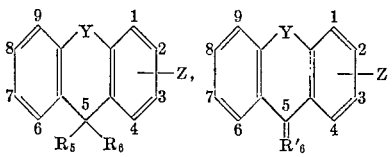

and nontoxic salts thereof, wherein Y is the radical $$-\overset{10}{C}H_2-\overset{11}{C}H_2-$$

or the radical $$-\overset{10}{C}H=\overset{11}{C}H-$$

Z is hydrogen, halogen, or alkyl sulfonyl such as methylsulfonyl, ethylsulfonyl, butylsufonyl, and the like, $R_5$ is hydrogen or hydroxy, $R_6$ is a substituted propyl radical of the formula

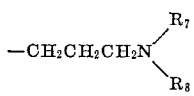

a pyrrolidinyl radical of the formula

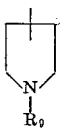

or a piperidyl radical of the formula

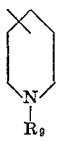

and $R'_6$ is a substituted propylidene radical of the formula

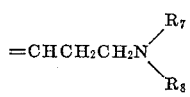

a pyrrolidinylidene radical of the formula

or a piperidylidene radical of the formula

wherein $R_7$ and $R_8$ are hydrogen, alkyl, or radicals in which the nitrogen atom forms part of a heterocyclic radical with $R_7$ and $R_8$, and $R_9$ is alkyl or hydroxyalkyl, provided that when $R_5$ is hydroxy, the radical

is other than monoalkylamino. Typical of the heterocyclic radicals which the group

may be are piperidino, pyrrolidino, piperazino, morpholino, substituted or unsubstituted, and the like. Representative of the nontoxic salts of the dibenzocycloheptenes are the acid addition salts derived from the hydrohalic acids such as hydrochloric acid and hydrobromic acid, sulfuric acid, nitric acid, phosphoric acid, citric acid, acetic acid, propionic acid, oxalic acid, succinic acid, tartaric acid, and the like. Also, quaternary ammonium salts such as those produced from dialkyl sulfates, alkyl halides, and the like, may be employed. Nontoxic is used in this specification in the sense that said salts do not produce intolerable side effects when administered at effective dosage levels. It will also be appreciated by those skilled in the art that the dibenzocycloheptenes having $R'_6$ at the 5-position may exist in enantiomorphic form when Z is other than hydrogen depending upon the configuration of the $R'_6$ group about the 5-carbon atom. The use of such enantiomorphs are also within the scope of this invention.

Typical of the dibenzocycloheptenes within the scope of the above formula are 5-hydroxy-5-(1-methyl-3-pyrrolidinyl)-10,11-dihydro-5H-dibenzo[a,d]cycloheptene, 3-chloro-5-(3-dimethylaminopropyl - 10,11-dihydro-5H-dibenzo[a,d]cycloheptene, 3-methylsulfonyl-5-(3-dimethylaminopropylidene)-5H-dibenzo[a,d]cycloheptene, 5-(3-methylaminopropylidene)-10,11-dihydro-5H-dibenzo[a,d]cycloheptene, also known as nortriptylene, 5-(3-dimethylaminopropylidene)-5H-dibenzo[a,d]cyclopheptene, 5-(1-methyl-4-piperidylidene) - 5H-dibenzo[a,d]cycloheptene, also known as cyproheptadine or Periactin, 5-(1-methyl-4-piperidylidene-10,11-dihydro-5H-dibenzo[a,d]cycloheptene, 5-(3-dimethylaminopropylidene)-10,11-dihydro-5H-dibenzo[a,d]cycloheptene, also known as amitriptyline, and 5 - (1-hydroxy-ethyl-4-piperidylidene) - 5H - dibenzo-[a,d]cycloheptene, and salts thereof. Preferred among the foregoing are 5-(3-methylaminopropylidene)-10,11-dihydro-5H-dibenzo[a,d]cycloheptene, 5-(3-dimethylaminopropylidene-5H-dibenzo[a,d]cycloheptene, 5-(1-methyl-4-piperidylidene-5H-dibenzo[a,d]cycloheptene, 5-(1-methyl-4-piperidylidene)-10,11-dihydro-5H-dibenzo[a,d]cycloheptene, 5-(3-dimethylaminopropylidene-10,11-dihydro-5H-dibenzo[a,d]cycloheptene, and 5-(1-hydroxyethyl-4-piperidylidene)-5H-dibenzo[a,d]cycloheptene, and most preferred is 5-(1-methyl-4-piperidylidene) - 5H - dibenzo-[a,d]cycloheptene, most preferably as the hydrochloric acid addition salt. Thus, the most preferred compositions of the present invention are those comprising 5-(1-methyl-4-piperidylidene-5H-dibenzo[a,d]cycloheptene with O,O-diethyl-O-naphthaloximido phosphate and 5-(1-methyl-4-piperidylidene) - 5H - dibenzo[a,d]cycloheptene and O,O-di(2-chloroethyl)-O-(3-chloro-4-methyl - 7 - coumarinyl) phosphate.

With regard to the individual amounts of the dibenzocycloheptene and the organo-phosphate used in the compositions, it is a feature of the invention that reduced dosages of the order of from one-eighth to one-half those normally employed for the individual ingredients if used alone may be employed. Such amounts will depend upon the activity of the organo-phosphates in the presence of the dibenzocycloheptene, and such should, of course, be considered in determining the amounts sufficient to provide an effective dosage for the proper treatment of the parasitic infection. These amounts will vary depending on the mode of treatment, the activity of the components, the size of the host, and the severity of infection. The compositions are highly effective against a phenothiazine-resistant strain of *Haemonchus contortus* and the strongyle species commonly found in sheep and cattle and ordinarily result in an overall efficacy of from about 3–7 times the efficacy that would be expected from the sum of the individual activities of each component if each were used alone. In this regard, neither of the active ingredients need be present at such dosage levels as to be anthelmintically active itself, it having been discovered that the compounds will display the augmented anthelmintic performance even when employed at levels which, if used alone, would not be anthelmintically active in the host. In fact, an added feature of the invention is to allow the use of dibenzocycloheptenes at levels which, if used alone, would not be anthelmintically active and further permits dosage levels of the organo-phosphates, which are toxic substances, to be substantially reduced over use levels heretofore employed. Generally, when single unit dosage forms such as tablets, boluses, or drenches are desired to be administered to the animal, suitable results are obtained when the compositions contain enough of the dibenzocycloheptene, in the presence of the organo-phosphate, to provide a dosage level of the dibenzocycloheptene of from about 1–125 mg./kg. of animal body weight whereas in the absence of organo-phosphate, dosages of about 5–250 mg./kg. are normally required to achieve the same degree of efficacy. Preferably the composition contains enough of the dibenzocycloheptene in the presence of the organo-phosphate to provide a dibenzocycloheptene dosage of from 5–50 mg./kg.

The amount of organo-phosphate used in the compositions in conjunction with the dibenzocycloheptenes and for which the enhancing action will ordinarily be achieved is generally an amount sufficient to provide from about 0.1 to 2.0 times the dibenzocycloheptene dosage level. On a weight ratio basis, therefore, this range corresponds to a dibenzocycloheptene; organo-phosphate ratio in the composition of from 1:0.1–1:2.0. Preferably, the ratio ranges from 1:0.2–1:1.5. Stated another way, the organo-phosphates are suitably present in the compositions to the extent of from 10–200% and preferably 20–150% based on the weight of dibenzocycloheptene present in the composition. Best results are obtained from compositions containing dibenzocycloheptene in amount sufficient to provide a dosage level of from 6.25–25 mg./kg. of body weight and sufficient of the most preferred organo-phosphates to provide a dosage level of from 2–25 mg./kg. of animal body weight. It will be noted by those skilled in the art that these levels of organo-phosphates are significantly reduced over those heretofore employed.

The combined amounts of each compound in the composition, as well as the remaining constituents of the composition, will vary according to the type of treatment to be employed, the host animal, and the particular parasitic disease being treated. In general, however, compositions containing a total weight percent of the dibenzocycloheptene and organo-phosphate ranging from 0.001 to 95% will be suitable, with the remainder being any suitable carrier or vehicle. Within this range, the relative amounts of the dibenzocycloheptene to organo-phosphate is not critical except to the extent that the resulting composition is pharmaceutically effective, considering the degree to which each compound contributes to enhancing the anthelmintic activity of the composition as described above. When the compositions are to be solid unit dosage forms as in tablets or boluses, the ingredients other than the dibenzocycloheptenes and organo-phosphates may be any other acceptable vehicles convenient in the preparation of such forms, and preferably materials nutritionally suitable such as starch, lactose, talc, magnesium stearate, vegetable gums, and the like. In such forms, the combined amounts of anthelmintic ingredients conveniently ranges from about 5% to 80% by weight of the total composition.

When the unit dosage form is to be in the form of a drench, the dibenzocycloheptenes and organo-phosphates may be mixed with agents which will aid in the subsequent suspending of the anthelmintic ingredients in water, such as bentonite, clays, water soluble starches, cellulose derivatives, gums, surface active agents, and the like to form a dry predrench composition, and this predrench composition added to water just before use. In the predrench formulation, in addition to the suspending agent, such ingredients as preservatives, antifoaming compounds, and the like may be employed. Such a dry product may contain over 95% by weight of the anthelmintic compounds, the rest being contributed by the excipients. Preferably, the solid composition contains from 30% to 95% by weight of the combined weights of the dibenzocycloheptene and organo-phosphates. Enough water should be added to the solid product to provide the proper dosage level within a convenient amount of liquid for a single oral dose. A commonly used measure in the field is one fluid ounce of material and thus that one fluid ounce of material should contain enough of the compounds to provide the effective dosage level. Liquid drench formulations containing from about 10 to 80 percent by weight of dry ingredients will, in general, be suitable with the preferred range being from 15 to 50 weight percent.

Where the compositions are intended to be used as feeds, feed supplements, or feed premixes, they will be mixed with suitable ingredients of an animal's nutrient ration. The solid orally ingestible carriers normally used for such purposes, such as distillers' dried grains, corn meal, citrus meal, fermentation residues, ground oyster shells, attapulgus clay, wheat shorts, molasses solubles, corn cob meal, edible vegetable substances, toasted dehulled soya grits, crushed limestone, and the like are all suitable. The anthelmintic agents are intimately dispersed or admixed throughout the solid inert carrier by methods such as grinding, stirring, milling, or tumbling. By selecting proper diluents and by altering the ratio of carrier to active ingredient, compositions of any desired concentration may be prepared. Feed supplement formulations containing from about 5% to about 50% by weight, and preferably from about 10–30% by weight of active ingredient are particularly suitable for addition to feeds. The active compounds are normally dispersed or mixed uniformly in the diluent but in some instances may be adsorbed on the carrier.

These supplements are added to the finished animal feed in an amount adequate to give the final concentration desired for controlling or treating helminthiasis by way of the animal ration. Although the preferred level in feeds will depend on the particular compounds being employed, the combined weights of the anthelmintic ingredients, i.e. the dibenzocycloheptene and organo-phosphate of this invention, are normally fed at levels of 0.05–25% in the feed. Where the treatment is prophylactic, smaller amounts may be employed, suitably of the order of 0.001–3.0 weight percent based on the weight of feed, and may be administered over long periods. An advantageous method of administering the compositions of this invention to animals whose feeds are conveniently pelleted, such as sheep, is to incorporate them directly in the pellets. For instance, the compositions of the present invention are readily incorporated in nutritionally adequate alfalfa pellets (during the pelleting operation) at levels of about 2 to 110 grams per pound of pellets for therapeutic use, and at lower levels for prophylactic use, and such pellets fed to the worm-infected animals. Alternatively, the anthelmintic compositions may be incorporated in salt licks or salt blocks at any desired concentration (concentrations of 5–25% by weight are conveniently employed). Large animals, such as sheep and cattle, then receive the anthelmintics with their salt.

Although it is preferred to administer the organo-phosphate with the dibenzocycloheptene together in a single composition, it is an added feature of the invention that the two compounds need not be administered simultaneously in one formulation. They may be administered separately, each in its own formulation if desired, to obtain the enhancing action referred to, provided that the administration of each is performed within such period of time as will allow the beneficial interaction between the dibenzocycloheptene and organo-phosphate against the helminths. This period of time will vary between different species of animal and from compound to compound. However, administration of one compound within as much as six hours of the other may be performed. If this mode of operation is practiced, the period is preferably not more than one hour.

The following examples are given for the purpose of illustration only and not by way of limitation.

EXAMPLE 1

Experimental infections of a phenothiazine-resistant strain of the large stomach worm *Haemonchus contortus*, of sheep, are established in Haemonchus-free hosts. Three groups of separate drench suspensions are prepared using a 2% w./v.) methyl cellulose aqueous suspension vehicle. One group of drenches is made up of separate drenches each containing one of the organo-phosphates listed in Table I alone. Another group is comprised of individual drenches containing the compositions listed in Table I. Drenches containing 5-(1-methyl - 4 - piperidylidene)-5H-dibenzo[a,d]cycloheptene alone are also prepared. Each drench is administered as a single oral dose to separate groups of hosts at the indicated dosage level. At the time of treatment, the infection is eight days old, and in a stage of development generally considered to be least responsive to chemotherapy. Worms remaining after treatment are determined at necropsy two days after dosing. Efficacy is determined as percent reduction in number of *Haemonchus contortus* in treated animals compared to the number harbored by untreated infected control animals. The percent reduction in worms is calculated from the formula $$\frac{Hc-Ht}{Hc} \times 100 = \text{percent reduction}$$

where Hc is the average number of Haemonchus in untreated infected control animals and Ht is the average number of Haemonchus in the treated group. The efficacy of the formulations containing both the organo-phosphate and the dibenzocycloheptene is compared in Table I to the expected efficacy.

EXAMPLE 2

A drench is prepared by suspending the following ingredients in one quart of water. The ingredients may be blended into a dry mix first and the entire mix added to the water or they may be individually added to the water.

|  | Grams |
|---|---|
| 5 - (1 - methyl - 4 - piperidylidene) - 5H - dibenzo [a,d]cycloheptene | 20.0 |
| O,O-diethyl-O-naphthaloximido phosphate (62.6% by weight active ingredient) | 8.0 |
| Polysorbate 80 polyoxyethylene (20) sorbitan monooleate (Tween 80; available from Atlas Chem. Co.) | 0.13 |
| Sorbitan monolaurate (Span 20; available from Atlas Chem. Co.) | 0.13 |
| Antifoam AF (emulsion of dimethylpolysiloxane; available from Dow-Corning) | 0.06 |
| Pregelatinized starch | 40.7 |
|  | 69.02 |

The total volume of the drench obtained after one quart of water is added is about 33 fluid ounces and contains about 5 g. of the organo-phosphate in addition to the dibenzocycloheptene compound. Each fluid ounce contains about 0.606 g. of the cycloheptene and about 0.15 g. O,O-diethyl-O-naphthaloximido phosphate.

EXAMPLE 3

A bolus containing 5-(1-methyl-4-piperidylidene)-5H-dibenzo[a,d]cycloheptene and O,O-di(2-chloroethyl)-O-(3-chloro-4-methyl-7-coumarinyl)phosphate suitable for oral administration to domesticated animals of about 50 pounds of body weight is prepared from the following ingredients:

|  | Grams |
|---|---|
| 5 - (1 - methyl - 4 - piperidylidene) - 5H - dibenzo [a,b]cycloheptene | 0.28 |
| O,O - di(2 - chloroethyl) - O - (3 - chloro - 4-methyl-7-coumarinyl)phosphate (71.3 weight percent active ingredient) | 0.55 |
| Dicalcium phosphate | 2.45 |
| Starch | 0.437 |
| Guar gum | 0.12 |
| Talc | 0.115 |
| Magnesium stearate | 0.033 |
|  | 3.985 |

TABLE I

| Composition | Dosage, Mg./kg. | Efficacy, Percent Reduction From Composition ||
|---|---|---|---|
|  |  | Actual | Expected * |
| 5-(1-methyl-4-piperidylidene)-5H-dibenzo[a, d]cycloheptene plus O,O-diethyl-O-naphthaloximido phosphate | 25 plus 3.93 | 75 | 11 |
| 5-(1-methyl-4-piperidylidene)-5H-dibenzo[a, d]cycloheptene plus O,O-diethyl-O-naphthaloximido phosphate | 12.5 plus 3.93 | 78 | 11 |
| 5-(1-methyl-4-piperidylidene)-5H-dibenzo[a, d]cycloheptene plus O,O-di(2-chloroethyl)-O-(3-chloro-4-methyl-7-coumarinyl)phosphate | 25 plus 17.83 | 75 | 42 |
| 5-(1-methyl-4-piperidylidene)-5H-dibenzo[a, d]cycloheptene plus O,O-di(2-chloroethyl)-O-(3-chloro-4-methyl-7-coumarinyl)phosphate | 12.5 plus 17.83 | 49 | 42 |
| 5-(1-methyl-4-piperidylidene)-5H-dibenzo[a, d]cycloheptene plus O,O-di(2-chloroethyl)-O-(3-chloro-4-methyl-7-coumarinyl)phosphate | 25 plus 8.92 | 70 | 21 |
| 5-(1-methyl-4-piperidylidene)-5H-dibenzo[a, d]cycloheptene plus O,O-di(2-chloroethyl)-O-(3-chloro-4-methyl-7-coumarinyl)phosphate | 12.5 plus 8.92 | 29 | 21 |

*Percent reductions for the organo-phosphate when administered alone since the 5-(1-methyl-4-piperidylidene)-5H-dibenzo[a, d]cycloheptene administered at 12.5, 25, or 50 mg./kg. is anthelmintically inactive.

As can be seen from the foregoing table, the actual efficacy of the compositions containing both the organo-phosphate and the dibenzocycloheptene generally far exceed what is to be expected. It is also to be noted that such efficacy is obtained at organo-phosphate dosage levels substantially below those normally employed when used alone.

The dicalcium phosphate is thoroughly mixed with the cycloheptene compound and the O,O-di(2-chloroethyl)-O-(3-chloro-4-methyl-7-coumarinyl)phosphate and the mixture reduced to a particle size finer than 60 mesh. To the mixture is added 0.270 g. of starch in the form of an aqueous starch paste and the resulting mixture granulated in the usual manner. The granules are then passed through a No. 10 mesh screen and dried at 110°–130° F. for about 18 hours, and the dried material then passed through a No. 16 mesh screen. The guar gum and the balance of the starch are added and the mixture thoroughly blended. The remainder of the ingredients are then added and the whole thoroughly mixed and compressed.

What is claimed:
1. The method for treating helminthiasis which comprises orally administering to an animal from 12.5 to 25 mg./kg. of body weight of 5-(1-methyl-4-piperidylidene)-5H-dibenzo-[a,d]-cycloheptene and 3.93 mg./kg. of body weight of O,O-diethyl-O-naphthaloximido phosphate.

2. The method of claim 1 wherein there is administered 12.5 mg./kg. of body weight of 5-(1-methyl-4-piperidylidene)-5H-dibenzo-[a,d]-cycloheptene and 3.93 mg./kg. of body weight of O,O-diethyl-O-naphthaloximido phosphate.

3. The method of claim 1 wherein there is administered 25 mg./kg. of body weight of 5-(1-methyl-4-piperidylidene)-5H-dibenzo-[a,d]-cycloheptene and 3.93 mg./kg. of body weight of O,O-diethyl-O-naphthaloximido phosphate.

4. The method for treating helminthiasis which comprises orally administering to an animal from 12.5 to 25 mg./kg. of body weight of 5-(1-methyl-4-piperidylidene)-5H-dibenzo-[a,d]-cycloheptene and from 8.92 to 17.83 mg./kg. of body weight of O,O-di-(2-chloroethyl)-O-(3-chloro-4-methyl-7-coumarinyl)phosphate.

5. The method of claim 4 wherein there is administered 25 mg./kg. of body weight of 5-(1-methyl-4-piperidylidene)-5H-dibenzo-[a,d]-cycloheptene and 17.83 mg./kg. of body weight of O,O-di-(2-chloroethyl)-O-(3-chloro-4-methyl-7-coumarinyl)-phosphate.

6. The method of claim 4 wherein there is administered 12.5 mg./kg. of body weight of 5-(1-methyl-4-piperidylidene)-5H-dibenzo-[a,d]-cycloheptene and 17.83 mg./kg. of body weight of O,O-di-(2-chloroethyl)-O-(3-chloro-4-methyl-7-coumarinyl)phosphate.

7. The method of claim 4 wherein there is administered 25 mg./kg. of body weight of 5-(1-methyl-4-piperidylidene)-5H-dibenzo-[a,d]-cycloheptene and 8.92 mg./kg. of body weight of O,O-di-(2-chloroethyl)-O-(3-chloro-4-methyl-7-coumarinyl)phosphate.

8. The method of claim 4 wherein there is administered 12.5 mg./kg. of body weight of 5-(1-methyl-4-piperidylidene)-5H-dibenzo-[a,d]-cycloheptene and 8.92 mg./kg. of body weight of O,O-di-(2-chloroethyl)-O-(3-chloro-4-methyl-7-coumarinyl)phosphate.

9. An anthelmintic composition comprising from 12.5 to 25 mg. of 5-(1-methyl-4-piperidylidene)-5H-dibenzo-[a,d]-cycloheptene and 3.93 mg. of O,O-diethyl-O-naphthaloximido phosphate.

10. The composition of claim 9 containing 25 mg. of 5 - (1-methyl-4-piperidylidene) - 5H - dibenzo-[a,d]-cycloheptene and 3.93 mg. of O,O-diethyl-O-naphthaloximido phosphate.

11. The composition of claim 9 containing 12.5 mg. of 5-methyl-4-piperidylidene - 5H - dibenzo-[a,d]-cycloheptene and 3.93 mg. of O,O-diethyl-O-naphthaloximido phosphate.

12. An anthelmintic composition comprising from 12.5 to 25 mg. of 5-(1-methyl-4-piperidylidene)-5H-dibenzo-[a,d]-cycloheptene and from 8.92 to 17.83 mg. of O,O-di-(2-chloro-ethyl)-O-(3-chloro-4-methyl-7-coumarinyl)-phosphate.

13. The composition of claim 12 containing 25 mg. of 5 - (1-methyl-4-piperidylidene) - 5H - dibenzo-[a,d]-cycloheptene and 17.83 mg. of O,O-di-(2-chloroethyl)-O-(3-chloro-4-methyl-7-coumarinyl)phosphate.

14. The composition of claim 12 containing 12.5 mg. of 5-(1-methyl-4-piperidylidene) - 5H - dibenzo - [a,d]-cycloheptene and 17.83 mg. of O,O-di-(2-chloroethyl)-O-(3-chloro-4-methyl-17-coumarinyl)phosphate.

15. The composition of claim 12 containing 25 mg. of 5 - (1-methyl-4-piperidylidene) - 5H - dibenzo-[a,d]-cycloheptene and 8.92 mg. of O,O-di-(2-chloroethyl)-O-(3-chloro-4-methyl-7-coumarinyl)phosphate.

16. The composition of claim 12 containing 12.5 mg. of 5-(1-methyl-4-piperidylidene-5H-dibenzo-[a,d]-cycloheptene and 8.92 mg. of O,O-di-(2-chloroethyl)O-(3-chloro-4-methyl-7-coumarinyl)phosphate.

References Cited

UNITED STATES PATENTS 2,811,480 10/1957 Norris.
2,985,660 5/1961 Judd.
3,014,911 12/1961 Engelhardt.

OTHER REFERENCES

Gavin, Veter. Bulletin, vol. 32, p. 460 (1962).
Chem. Abst. (1), 59, p. 3240C, 1963.
Chem. Abst. (2), 59, pp. 5101e–5102F (1963).
Chem. Abst. (3) 59, p. 11512b (1963).
Chem. Abst. (4), 58, p. 14637F (1963).
Chem. Abst. (5), 61 pp. 7574H-7575a (1964).

ALBERT T. MEYERS, Primary Examiner

STANEY J. FRIEDMAN, Assistant Examiner

U.S. Cl. X.R.

424—203, 211, 225, 330, 248, 250, 267, 274

PO-1050
(5/69)

UNITED STATES PATENT OFFICE
CERTIFICATE OF CORRECTION

Patent No. 3,484,520          Dated December 16, 1969

Inventor(s) Joseph Di Netta and John R. Egerton

It is certified that error appears in the above-identified patent and that said Letters Patent are hereby corrected as shown below:

Column 10: Line 6, "5-methyl-4-piperidylidene" should read -- 5-(1-methyl-4-piperidylidene) --.

SIGNED AND SEALED

APR 28 1970

(SEAL)
Attest:

Edward M. Fletcher, Jr.
Attesting Officer

WILLIAM E. SCHUYLER, JR.
Commissioner of Patents